Oct. 28, 1969    P. F. PULJER    3,475,701
SUB-MINIATURE COUPLER

Filed May 15, 1967    2 Sheets-Sheet 1

INVENTOR.
PHILIP F. PULJER
BY
BOSWORTH, SESSIONS
HERRSTROM and KNOWLES

Oct. 28, 1969   P. F. PULJER   3,475,701
SUB-MINIATURE COUPLER
Filed May 15, 1967   2 Sheets-Sheet 2

INVENTOR.
PHILIP F. PULJER
BY
Bosworth, Sessions,
Herrstrom and Knowles

United States Patent Office 3,475,701
Patented Oct. 28, 1969

3,475,701
SUB-MINIATURE COUPLER
Philip F. Puljer, Parma, Ohio, assignor to
Bird Electronic Corporation
Filed May 15, 1967, Ser. No. 638,453
Int. Cl. H01p 5/14
U.S. Cl. 333—10                                         4 Claims

ABSTRACT OF THE DISCLOSURE

Couplers for microwave energy are used in electrical devices in many different ways involving sensing the amount and direction of flow of power in coaxial cables. In this particular invention, the coupler assembly is mounted on an assembly plate element which is substantially rectangular in shape and having a width only slightly greater than the diameter of the feed-through capacitors comprising the largest elements of the pick up units or coupler units. Further, the feed-through capacitors are all aligned on the mounting strip plate in the plane of the longitudinal axis of the plate. Still further, because of the extremely compact nature of the subject coupler, the capacitive probe is formed of a relatively small rectangular "balancing" plate mounted on one end of a resistor. This resistor may be selectively positioned relative to a thimblelike capacitive electrode mounted on the coupler assembly.

BRIEF SUMMARY OF THE INVENTION

Briefly, this invention relates to a microstrip coupler and more particularly to a sub-miniature microstrip coupler capable of operating over a wide frequency range while occupying a minimum of space and capable of accurately coupling a predetermined energy range in the radio frequency power range. Generally speaking, a microstrip line section is a device for connecting two sections of coaxial line which can provide for the sensing of electrical energy in both a forward and reflective direction relative to the load.

Besides achieving compactness of design, which has heretofore been lacking in such couplers but which has been desired since the advent of miniature solid state electrical instruments, this coupler is extremely sturdy, economical both in construction and use and hence represents increased savings to both the manufacturer and consumer. Furthermore, this particular design constitutes an advance in the technology of miniaturization of electrical components as will become more evident below. One embodiment of the microstrip coupler here described occupies a volume less than one-quarter the volume of other microstrip couplers presently known in the art, such as the coupler described in my earlier application. A comparable weight reduction is also accomplished by the design, all being accomplished without loss of electrical characteristics of the prior invention.

This invention represents significant advances in the art in that it uses an optimum design of the coupler housing, together with a novel layout of presently available parts as to make such a reduction in size feasible in an operative device. Furthermore, the housing design and layout of parts has been so determined as to allow a prescribed change of electrical components such as resistors, capacitors, diodes, coils, and capacitive elements which will make the device operative in a correspondingly prescribed frequency interval and power range. By such prescribed changes, the design of this invention has been determined operative at least in intervals of frequency between 25 megacycles and 1000 megacycles and in a power range covering of the order of milliwatts to 100 watts.

The microstrip line section is a substantially flat ribbon conductor preferably mounted on an insulating member and positioned on the inner floor of the microstrip housing, which housing is preferably formed of non-ferrous metal. The enclosure for the microstrip line is completed by a plate assembly element supported by the housing in parallel relationship to the floor to substantially enclose the region above the microstrip ribbon conductor. The plate assembly is enclosed in the housing by a lid or cover. Advantageously, the electrical elements of the plate assembly are all mounted in axial alignment with the longitudinal axis of the plate assembly. The assembly includes four feed-through or button type capacitors, two variable capacitors and two resistors, and a pair of coil elements. These elements are positioned such that they lie substantially within a longitudinal plane bisecting the plate element assembly. Further, a pair of diodes are mounted on the plate element assembly with their terminals connected to a pair of the terminals of the feed-through capacitors such that the diodes lie substantially along the longitudinal axis of the plate element assembly. The housing lid or cover is substantially U-shaped in cross-section and includes a pair of terminals of feed-through capacitors, each connected to one of the sensing units, and a third terminal connected to the housing to comprise a common ground.

DETAILED DESCRIPTION OF THE INVENTION

This invention is chiefly concerned with apparatus for achieving a measurement of power transmitted or power reflected, or both, in a coaxial cable.

Figure 1:
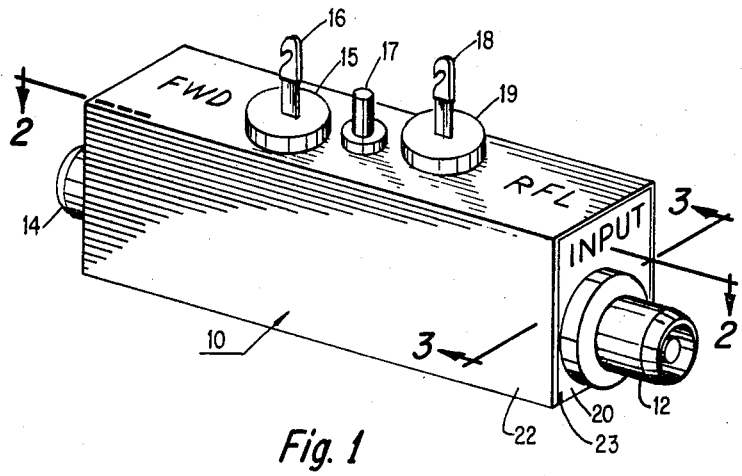
FIGURE 1 is a view in perspective, to an enlarged scale, of a microstrip coupler according to this invention.
Figure 2:
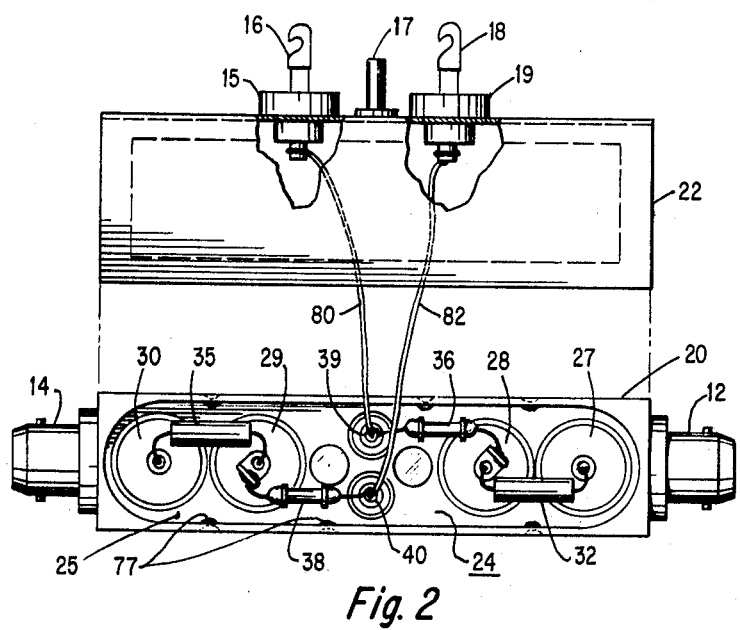
FIGURE 2 is an exploded diagram, showing the cover of the coupler of FIGURE 1 removed and showing in plan a plate element assembly positioned within a housing.
Figure 3:
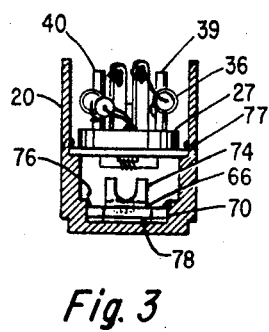
FIGURE 3 is a view in section taken along the lines 3—3 of FIGURE 1 and looking in the direction of the arrows.
Figure 4:
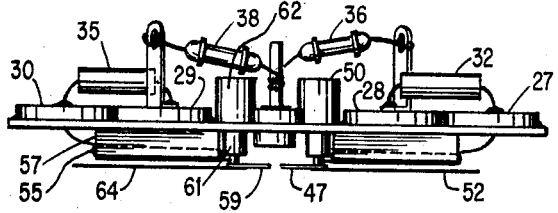
FIGURE 4 is a view in elevation of the plate element assembly of one embodimnet of the invention.

In one embodiment of this invention, a microstrip coupling assembly 10 is mounted in a suitable housing of the type shown in perspective in FIGURE 1. This assembly couples power from a coaxial coupling member 12, which is the input to the sensing unit, to an output coupling assembly 14. These connectors 12 and 14 are coaxial type connectors of the type well-known in the art. This coupling assembly provides one coupling assembly for the measurement of forward power which is secured between a forward power terminal 16 and a common ground 17. A second coupling assembly is provided for measuring reflected power which is sensed between an output terminal 18 and common ground terminal 17. Terminals 16 and 18 are mounted in the cover 22 and are part of feed-through capacitors 15 and 19, respectively.

Figure 5:
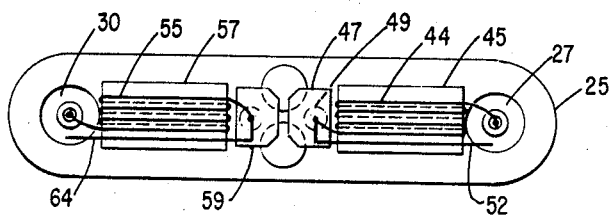
FIGURE 5 is a bottom plan view of the plate element assembly of FIGURE 4.
Figure 6:
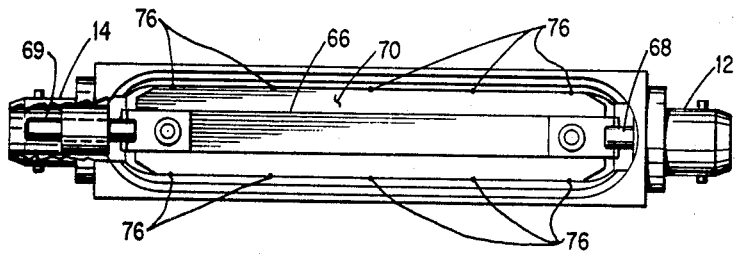
FIGURE 6 is a plan view of the housing with the microstrip line in position and with the plate element assembly of FIGURES 4 and 5 removed.
Figure 7:
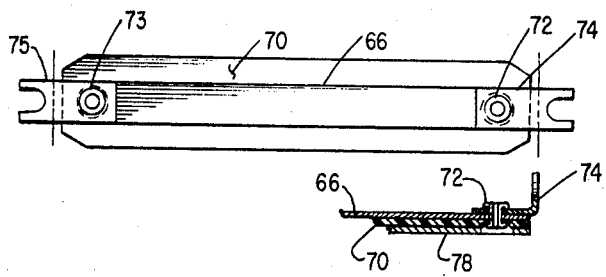
FIGURE 7 is a plan view of the microstrip element prior to assembly and showing a fragmentary view of a portion of the microstrip section, including a connector tab bent along the line indicated in phantom so that the microstrip section may be assembled in the housing.

The assembly 10 includes a housing 20 which is substantially rectangular except that one wall is removed, and a cover plate 22, which is substantially U-shaped in cross-section so that it may be slid down in close fitting engagement over the housing 20. Lid 22 is secured to housing 20 by soldering at 23. The coupling unit includes a plate element sub-assembly 24, including a substantially rectangular plate element 25, which has its corners rounded off, as best seen in FIGURE 5. Mounted on the plate element 25 are four feed-through type capacitors 27, 28, 29 and 30. Each of these feed-through capacitors is preferably of the button mica type and are mounted by soldering their outer plate element to the plate element 25 with the axis of the feed-through capacitors 27–30 lying in a plane corresponding to the center line of the plate element 25. Feed-through or button capacitors 27–30 are the largest elements on the plate element 25. By positioning these capacitors with their axes in the plane of the longitudinal axis of the plate 25, this plate need have a width only slightly greater than the diameter of the capacitor. Further, plate 25 can fit within housing 20 which has a cavity only slightly wider than the diameter of the feed-through capacitors 27–30.

A first diode 32 has its terminals connected between the center or feed-through terminals of capacitors 27 and 28, respectively, and a second diode 35 has its terminals connected between the central or feed-through terminals of capacitors 29 and 30. The forward energy coupling unit is positioned closest to the input connector 12 and includes a calibrating resistor 36. The reflected energy coupling unit includes a calibrating resistor 38. These resistors are connected to terminals 39 and 40, respectively. The forward coupling unit includes feedthrough capacitors 27, 28 and diode 32. A coil 44 is wound on a plastic block 45. Block 45 is secured on the bottom of plate 25 by adhesive. One end of coil 44 is connected to the center electrode of capacitor 27 and the other end is connected to a balancing tab 47. Tab 47 is mounted on one terminal of a resistor 49. A thimble-like capacitor electrode 50 is soldered or otherwise secured to plate 25 with its opening encircling an aperture in plate 25. Resistor 49 is positioned in this aperture and opening and has its other terminal soldered to capacitor electrode 50. Throughout a major portion of its length, resistor 49 acts as a cooperating capacitive electrode for electrode 50, the latter of which serves as a ground terminal for resistor 49. A rod-like capacitor electrode 52 is connected to balancing tab 47. These two elements are capacitively coupled to the microstrip line section and the coil 44 is inductively coupled to the line section, which will be subsequently described.

These second or reflected energy coupling assembly includes calibrating resistor 38, diodes 35, capacitors 29 and 30 and a coil 55 on a plastic form 57. Coil 55 is connected between capacitor 30 and a balancing tab 59 mounted on one terminal of a resistor 61. Resistor 61 is mounted in thimble-like capacitor electrode 62 similar to thimble electrode 50. The second coupling assembly also includes a capacitor electrode 64 mounted on tab 59.

These coupling assemblies are inductively and capacitively coupled to a microstrip line section 66 which is a flat ribbon-like conductor connecting terminals 68 and 69, the inner conductors of connectors 12 and 14, respectively. Line 66 is secured on an insulating strip 70 by means of an adhesive. A pair of rivets or eyelets 72, 73 secure connectors strips 74, 75, respectively, on strip 70 and these connections are soldered to improve the electrical characteristics.

The microstrip assembly is "peened" or "staked" in position in housing 20, as indicated at 76. Also, the plate assembly is secured in housing 20 by dimpling the housing walls inwardly, as indicated at 77.

The microstrip line section assembly includes a "ground plane" conuductor strip 78 secured to the bottom of insulating strip 70. Conductor 78 is in contact with housing 20 and is cut away in the region of recessed eylets 72, 73 to prevent short circuiting or grounding of conductor 66.

The forward energy coupling assembly is coupled to terminal 16 of feed-through capacitor 15 by means of lead 80 and terminal 18 of capacitor 19 is connected to the reflected energy coupler by lead 82.

While I have shown and described one illustrative embodiment of this invention, it is understood that the concepts thereof could be employed in other embodiments without parting from the spirit and scope of this invention.

I claim:

1. In a microstrip coupling assembly, the combination comprising:
   an elongated, hollow metal housing having side-walls and a bottom, a coaxial-coupling on each end of said housing, each coupling including an outer conductor and an inner conductor insulatingly supported from said outer conductor;
   a strip line assembly in said housing including an insulating strip secured to said bottom and a conducting strip on said insulating strip connecting the inner conductors of said coaxial couplings;
   an elongated plate element defining a portion of a sub-assembly mounted in said housing above said strip assembly, said plate element having a series of circular apertures therein, said apertures lying in a common plane, said plane substantially bisecting said plate element, said sub-assembly including a first coupling unit having a plurality of capacitors, each positioned on said plate element with one electrode encircling one of said apertures and the other electrode substantially axially aligned with one of said apertures, a thimble-like capacitor electrode mounted on said plate element and aligned with one of said apertures, a resistor mounted in said thimble-like capacitor electrode and projecting beneath said plate element, an inductive member inductively coupled to said conducting strip and connected between one of said other electrodes of one of said capacitors and one terminal of said resistor, the other terminal of said resistor being connected to said thimble-like capacitor electrode, a diode connected between two of said other terminals of said capacitors; and
   a cover for said housing, said cover having a plurality of terminals thereon, one of said terminals being coupled to one of said capacitors, another of said terminals being connected to said cover.

2. The assembly according to claim 1 wherein one of said terminals on said lid is connected to a feed-through type capacitor mounted in said lid, and a resistor connecting, said terminal to one of said other terminals of one of said capacitors and to said diode.

3. The assembly according to claim 1 further including a balancing tab capacitively coupled to said insulating strip, connected to said inductive element and positioned in a plane substantially parallel to said conducting strip.

4. The assembly according to claim 1 including a second coupling unit identical to said first unit and mounted on said plate element, one of said units receiving energy transmitted in a forward direction relative to said conducting strip, the other unit receiving energy in a reflected direction relative to said conducting strip.

References Cited

UNITED STATES PATENTS 2,852,741   9/1958   Bird et al. _____ 324—95

HERMAN K. SAALBACH, Primary Examiner

M. NUSSBAUM, Assistant Examiner

U.S. Cl. X.R.

333—84